US009015691B2

(12) United States Patent
Burka (10) Patent No.: US 9,015,691 B2
(45) Date of Patent: Apr. 21, 2015

(54) SOFTWARE OBJECT LOCK MANAGEMENT USING OBSERVATIONS (71) Applicant: International Business Machines Corporation, Armonk, NY (US)

(72) Inventor: Peter W. Burka, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/141,939

(22) Filed: Dec. 27, 2013

(65) Prior Publication Data

US 2014/0115570 A1 Apr. 24, 2014

Related U.S. Application Data (63) Continuation of application No. 12/982,995, filed on Dec. 31, 2010, now Pat. No. 8,707,285.

(30) Foreign Application Priority Data

Feb. 22, 2010 (CA) ..................................... 2693938

(51) Int. Cl.
*G06F 9/44* (2006.01)
*G06F 9/445* (2006.01)
*G06F 9/52* (2006.01)

(52) U.S. Cl.
CPC ............... *G06F 9/445* (2013.01); *G06F 9/526* (2013.01)

(58) Field of Classification Search
None
See application file for complete search history.

(56) References Cited

U.S. PATENT DOCUMENTS

| 5,327,563 A  * | 7/1994  | Singh ........................... 713/193 |
| 6,081,665 A  * | 6/2000  | Nilsen et al. .................. 717/116 |
| 6,173,442 B1   | 1/2001  | Agesen et al. |
| 6,178,463 B1   | 1/2001  | Houston et al. |
| 6,314,563 B1 * | 11/2001 | Agesen et al. ................ 717/108 |
| 6,594,708 B1   | 7/2003  | Slaughter et al. |
| 6,684,392 B2   | 1/2004  | Eidt |
| 6,735,760 B1   | 5/2004  | Dice |
| 6,918,126 B1   | 7/2005  | Blais |
| 7,150,009 B2   | 12/2006 | Bacon et al. |
| 7,181,731 B2 * | 2/2007  | Pace et al. ..................... 717/136 |
| 7,796,713 B2   | 9/2010  | Lee |
| 2002/0147873 A1| 10/2002 | Kwon et al. |
| 2003/0208500 A1*| 11/2003| Daynes et al. ................ 707/100 |
| 2004/0216150 A1| 10/2004 | Scheifler et al. |
| 2005/0077937 A1*| 4/2005 | Meyer .......................... 327/158 |

(Continued)

OTHER PUBLICATIONS

"U.S. Appl. No. 12/982,995 Office Action", Jun. 10, 2013, 15 pages.

(Continued)

*Primary Examiner* — Chameli Das
(74) *Attorney, Agent, or Firm* — DeLizio Gilliam, PLLC (57) ABSTRACT A method includes loading a software class containing class information for a lock state. The method includes allocating an instance of a software object derived from the software class, wherein the allocating includes allocating of a lock word as part of the instance of the software object. The lock word defines whether the object is locked by a thread of multiple threads. The method includes observing activity relative to the instance of the software object. The method includes responsive to observing the activity relative to the instance of the software object that indicates that the lock state of the instance of the software object is non-locking, removing the lock word from the instance of the software object.

17 Claims, 6 Drawing Sheets

(56) References Cited

U.S. PATENT DOCUMENTS

| | | | |
|---|---|---|---|
| 2005/0188164 A1 | 8/2005 | Ballantyne et al. | |
| 2006/0020821 A1* | 1/2006 | Waltermann et al. | 713/189 |
| 2006/0026430 A1 | 2/2006 | Luo | |
| 2006/0059287 A1 | 3/2006 | Rivard | |
| 2006/0200681 A1* | 9/2006 | Kato et al. | 713/193 |
| 2006/0248284 A1* | 11/2006 | Petev | 711/141 |
| 2007/0011451 A1 | 1/2007 | Botzum et al. | |
| 2007/0067771 A1* | 3/2007 | Kulbak et al. | 718/100 |
| 2007/0169042 A1 | 7/2007 | Janczewski | |
| 2008/0021908 A1* | 1/2008 | Trask et al. | 707/100 |
| 2008/0086628 A1* | 4/2008 | Rodgers et al. | 713/1 |
| 2008/0250213 A1* | 10/2008 | Holt | 711/159 |
| 2009/0033392 A1* | 2/2009 | Kim | 327/161 |
| 2010/0088476 A1* | 4/2010 | Inagaki et al. | 711/152 |
| 2010/0122260 A1 | 5/2010 | Kawachiya et al. | |
| 2010/0241774 A1 | 9/2010 | Olszewski et al. | |
| 2010/0275209 A1 | 10/2010 | Detlefs | |
| 2011/0209130 A1 | 8/2011 | Burka | |
| 2011/0234324 A1* | 9/2011 | Mei | 331/17 |
| 2012/0227045 A1* | 9/2012 | Knauth et al. | 718/100 |
| 2014/0059698 A1* | 2/2014 | Furuya | 726/26 |

OTHER PUBLICATIONS

Bacon, David F. et al., "Header Compression Techniques", Chapter 3 from ECOOP 2002-Object-Oriented Programming: 16th European Conference, Malaga, Spain Jun. 10-14, 2002, 5 pages.

Venstermans, Kris et al., "Java Object Header Elimination for Reduced Memory Consumption in 64-Bit Virtual Machines", ACM Transactions on Architecture and Code Optimization, vol. 4, No. 3, Article Sep. 17, 2007, 30 pages.

U.S. Appl. No. 12/982,995, filed Dec. 31, 2010, Burka, Peter B.

* cited by examiner

SOFTWARE OBJECT LOCK MANAGEMENT USING OBSERVATIONS

RELATED APPLICATIONS

This application is a Continuation of and claims the priority benefit of U.S. application Ser. No. 12/982,995 filed Dec. 31, 2010 which claims priority benefit of Canadian Patent Application No. 2693938, titled "Software Object Lock Management Using Observations", having a priority date of Feb. 22, 2010.

BACKGROUND

Embodiments of the inventive subject matter generally relate to the field of managing locks in a data processing system and more specifically to software object lock management using observations In a multi-threaded managed runtime, such as a Java™ Virtual Machine, applications and middleware such as IBM® WebSphere® Application Server are typically permitted to synchronize, or lock an object. Locking an object allows multiple threads to safely operate on objects by guaranteeing atomicity. In Java this is done using the 'synchronized' keyword. The locking technique can be applied to particular methods (synchronized methods) or blocks of code within methods (synchronized blocks). The runtime must be able to lock objects efficiently to achieve maximum performance. Typically, each object has a word reserved in the object header which is used to implement locking (the lock word). While the reserved word allows for efficient locking, allocating space for the lock word can be wasteful. In real-world applications, typically a small fraction of objects actually participate in locking. Therefore the lock word remains unused while contributing to an increased object footprint and reduced cache efficiency.

A technique to reduce object header sizes, referred to as a lock-nursery, requires identification of objects which are used in multi-threaded lock operations. Objects which are identified as requiring locking are given a special lock word in the object body, while other objects have no lock word. The technique saves a word in objects which are identified as non-locking. Since locking objects are typically a small subset of the object population the memory savings can be substantial.

However there is a significant penalty for misidentifying an object as non-locking. Instead of using an easily located lock word in the object body, the runtime system must refer to a side table to find a lock for the object. A simple heuristic has been proposed to identify locking objects. Any object which is an instance of a class that includes synchronized methods is considered to be a locking object. All other objects are considered to be non-locking. While suitable for benchmarks, real world experience has shown that this heuristic is insufficient for certain applications. Some classes which use locks extensively may have no synchronized methods. When these characteristics are important in a specific application, performance may suffer an unacceptable degradation.

A proposed solution involves detecting when the heuristic fails at runtime. When a sufficient number of locking operations are performed on non-locking objects, the runtime system could quiesce all threads and then "grow" the objects in question, giving them a lock slot. However growing an object at runtime can be a very expensive and time consuming operation. Growing a software object would require patching all just in time compiled code which allocates such objects to reflect the new object size. Resizing may not be possible at all when the system is low on memory, because the resized objects consume more memory and possibly more memory than is available.

SUMMARY

In some embodiments, a method includes loading a software class containing class information for a lock state. The method includes allocating an instance of a software object derived from the software class, wherein the allocating includes allocating of a lock word as part of the instance of the software object. The lock word defines whether the object is locked by a thread of multiple threads. The method includes observing activity relative to the instance of the software object. The method includes responsive to observing the activity relative to the instance of the software object that indicates that the lock state of the instance of the software object is non-locking, removing the lock word from the instance of the software object.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, some example embodiments may take the form of a computer program product tangibly embodied in any medium of expression with computer usable program code embodied in the medium.

Computer program code for carrying out operations of some example embodiments may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some example embodiments are described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
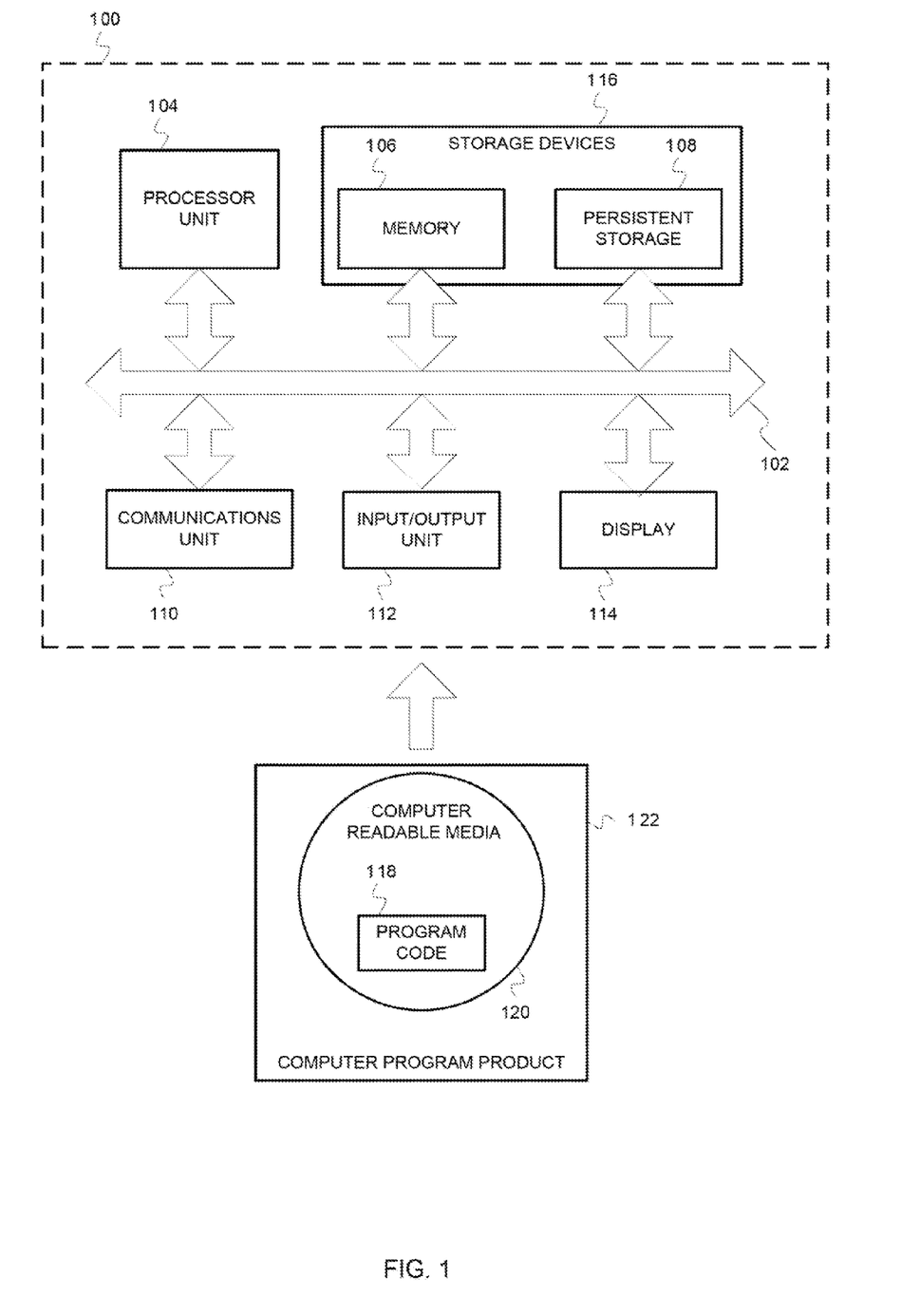
FIG. 1 depicts a block diagram of an exemplary data processing system operable, according to some example embodiments.

FIG. 1 depicts a block diagram of an exemplary data processing system operable, according to some example embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system 100 providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Using data processing system 100 of FIG. 1 as an example, an illustrative embodiment provides the computer-implemented process stored in memory 106, executed by processor unit 104, for software object lock management using observations. Processor unit 104 loads a class containing class information for a state and a lock count, from memory 106, allocates an instance of an object using the class information for the state to form an instance, and receives a lock request associated with the instance from communications unit 110, input/output unit 112 or display 114. Processor unit 104 selects a runtime behavior associated with the instance according to the class information. Processor unit 104 determines whether the lock count is greater than a threshold value, and responsive to a determination that the lock count is not greater than a threshold value, sets the class information for the state to non-locking and removes a lock field from the instance in storage devices 116.

An embodiment for software object lock management using observations typically provides a simpler technique than a previous technique of growing objects at runtime by "shrinking" the objects. For example, an embodiment improves upon a lock nursery heuristic by observing objects for a predetermined period of time, using a timer, to determine whether the objects are locking objects. Objects determined to be non-locking will then have the lock word of the object removed. Typically when an object is used for locking the object is likely to be locked frequently and immediately. This locking activity is particularly true of objects in which locking is critical to performance.

In some example embodiments of software object lock management using observations, all objects are initially created with a lock word and placed in a state referred to as 'observation' mode. In an example, once an object, or class of objects, has been observed for a predetermined period of time, a determination is made as to whether or not the object requires the lock word. The determination in this example is based on how many times objects of a particular class, have been used for locking during the observation period. When a lock word is not required, eliminating the lock word and associated space, either immediately or lazily, reduces the object size. For example, when the object is moved due to compaction an opportunity arises to reduce the size of the object as part of the compaction operation.

The technique of the embodiment for software object lock management using observations differs from previously proposed heuristics because heuristics of the embodiment can detect objects used for locking which typically cannot be detected through simple static analysis. The embodiment shrinks an object that does not require locking, rather than previously proposed solutions that grow objects to accommodate use of the lock word. The example embodiment does not require moving objects because the objects can generally be shrunk in place. Implementation of the embodiment may typically require a simple patch to affected just in time compiled code since the technique requires only removing code rather than adding code as suggested by previous techniques. Implementation may also be performed without patching just in time code at all. In other examples, just in time code, especially for hot methods, will often be unaffected because shrinking only affects allocation sites which were compiled while the objects in question were still in observation mode. Shrinking can be done lazily or incrementally to be more responsive to the workload needs of the data processing system.

In some example embodiments, program code 118 containing the computer-implemented process may be stored within computer readable media 120 as computer program product 122. In another illustrative embodiment, the process for software object lock management using observations may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit 104 of the apparatus executes the computer executable program code to direct the apparatus to perform the process.

Figure 2:
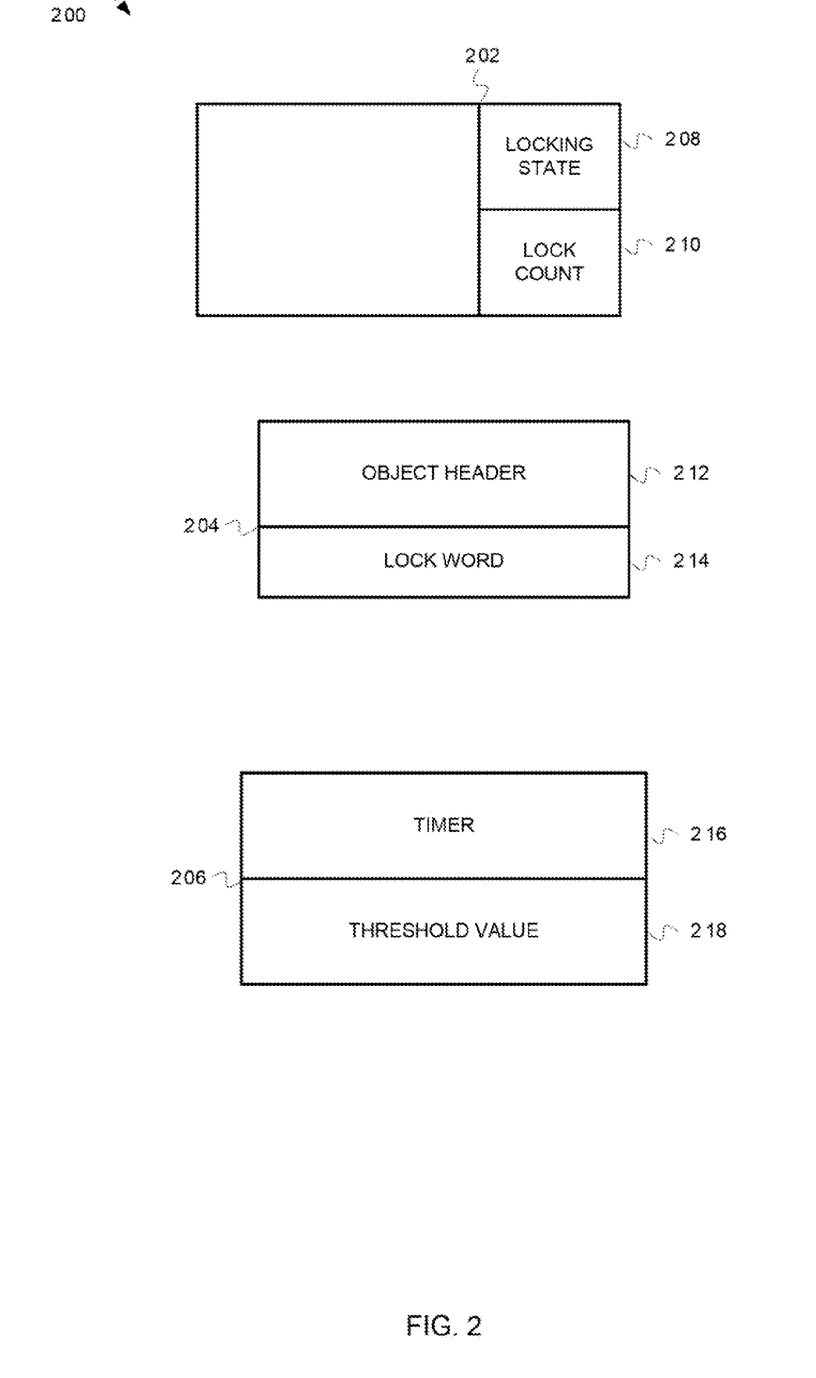
FIG. 2 depicts a block diagram of enhanced memory management components, according to some example embodiments.

FIG. 2 depicts a block diagram of enhanced memory management components, according to some example embodiments. Data structures 200 represent a set of enhanced data structures including class 202, structure 204 and structure 206, that may be used in addition to existing data structures typically associated with a memory management portion of a data processing system such as data processing 100 of FIG. 1.

Class 202 represents class structure, also known as a type information block, that has been extended to include fields of locking state 208 and lock count 210. Locking state 208 will contain one of three values representing observing, locking and non-locking states. For example, the field may contain the text string form or other representation such as a numeric value of 1, 2 or 3 corresponding to the characteristics of the lock state. Lock count 210 is used to record a counter value of the number of times instances of the class were locked while the class was in the observing state.

Structure 204 represents a portion of an object instance allocation. The allocation contains object header 212 that is extended to include lock word 214. Space is included during allocation for lock word 214 whenever the instance is allocated while the locking state of the class is either observing or locking.

Structure 206 includes timer 216 and threshold value 218. Timer 216 provides a capability to measure time duration. For example, timer 216 can be used to measure the time since an object was allocated in an observing state. The duration may be further specified as a predetermined amount after which an event is triggered. Threshold value 218 provides a capability to store a predetermined value representing a variety of factors including a number of lock requests for instances of a class, wall clock time or processor time, a number of objects allocated, a number of garbage collection cycles processed or combinations of measurable attributes.

Figure 3:
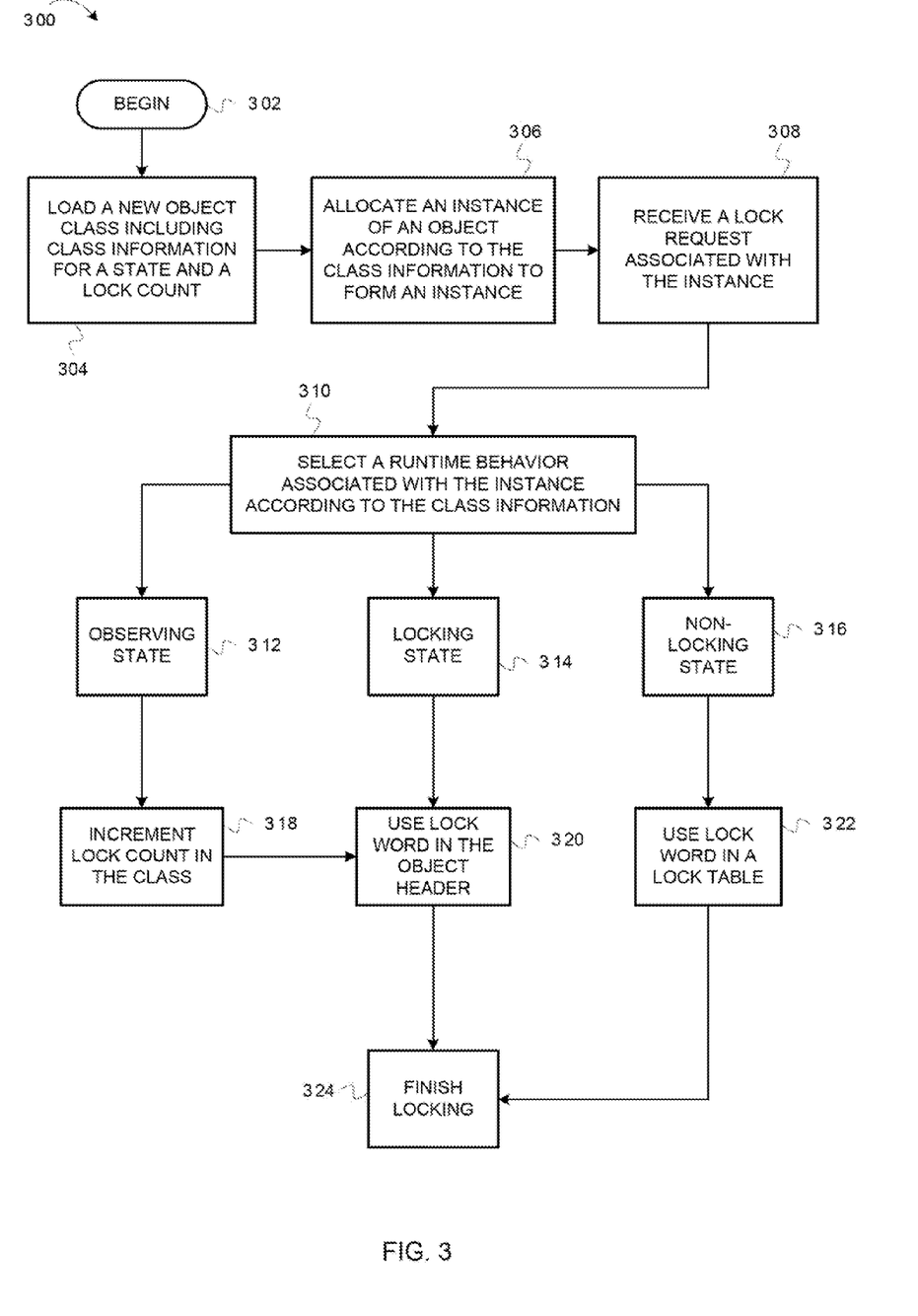
FIG. 3 depicts a block diagram of a lock acquisition process for an object, according to some example embodiments.

FIG. 3 depicts a block diagram of a lock acquisition process for an object, according to some example embodiments. Process 300 is an example using data structures 200 of FIG. 2.

Process 300 starts (302) and loads a new object class including state and lock count information (304). Process 300 allocates an instance of an object according to the state information to form an instance (306). State information of the class is used in the allocation process to determine whether a lock word is included in the object. Process 300 receives a lock request associated with the instance (308). Select runtime behavior associated with the instance according to the class state information is performed (310). Initialization occurs when the new class is loaded and causes the enhanced data structures depicted in FIG. 2 as data structures 200 to be loaded. When the new class is loaded the class is placed into an observing state (312) and a lock count is set to zero. When an instance of an object is allocated the allocation service includes space in the object header body for a lock word whenever the class is in an observing state (312) or locking state (314). When the class state is non-locking state (316) the lock word and associated space is omitted from the object.

When an attempt is made to lock an object, the runtime checks to determine the current state the object class. When the class is in observing state (312), the runtime records that a lock has been used by incrementing lock count in the class (318) and proceeds to use the lock word in the object (320). When the class is in locking state (314), the runtime uses the lock word provided in the object (320) as previously stated. When the class is in non-locking state (316), the runtime looks up the lock in a lock table and uses the lock word in the lock table (322). Use of a lock table is well known. Process 300 finishes locking (324).

Figure 4:
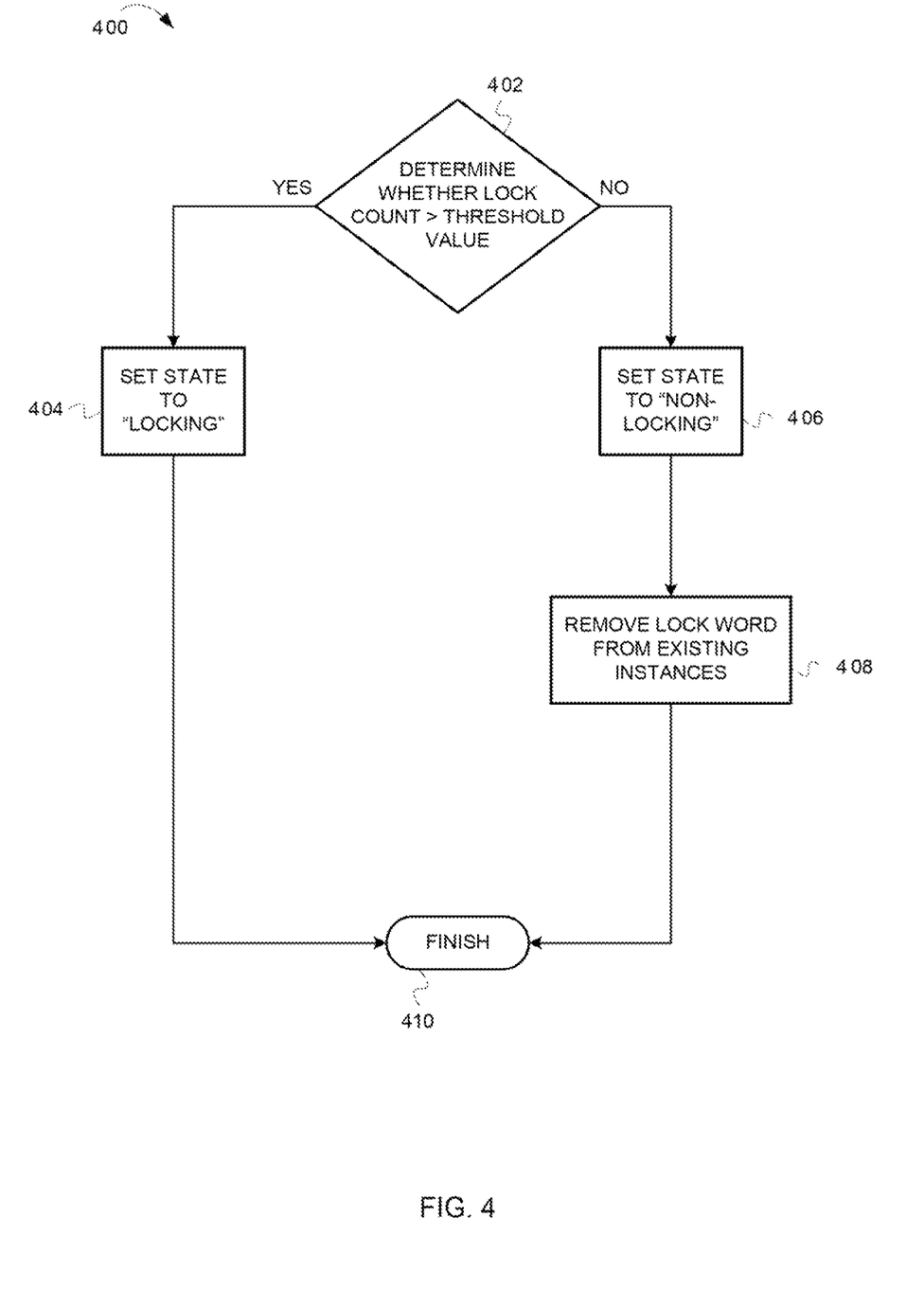
FIG. 4 depicts a block diagram of transitioning class states in the lock acquisition process of FIG. 3, according to some example embodiments.

FIG. 4 depicts a block diagram of transitioning class states in the lock acquisition process of FIG. 3, according to some example embodiments. Process 400 is an example that is used in cooperation with process 300 of FIG. 3 to transition between the locking states of observing, locking and non-locking.

Process 400 may be used to transition the class from observing state to locking state or non-locking state upon expiration of a predetermined amount of time or regardless of the passage of time. In addition events may also be used to trigger a transition in a similar way that time periods are used.

Process 400 begins by determining whether the locking on instances of the class represented by a lock count is greater than a predetermined threshold value (402). When a determination is made that the lock count is greater than the predetermined threshold value, change the class state to locking is performed (404) with process 400 terminating thereafter (410).

When a determination is made that the lock count is not greater than the predetermined threshold value, change the class state to non-locking is performed (406). In addition process 400 removes the lock word from existing instances of the class (408) and terminates thereafter (410). Instances of a class which transitions from observing to non-locking have the lock word field removed. Removal can be done immediately by walking all objects in the heap and altering the objects in place. A more sophisticated system may defer shrinking the objects until such time as the space used by the lock word can be usefully reclaimed. The details of such an optimization are outside of the scope of this disclosure, but should be apparent to one skilled in the art. An allocation site, which allocates instances of the class, should be patched to allocate smaller sized objects. This can be done immediately, it can be deferred, or it can even be omitted if the allocation site includes a runtime check to determine the correct instance size.

The amount of time that a class is observed for, and the threshold, which determines whether locking activity is significant may differ depending on the implementation. However a typical implementation will use a threshold of zero. That is, if any locking has been done on observed objects within the observation period, the objects will be treated as locking. The observing time period may be based on, for example real time or processor time, the number of objects allocated, the number of garbage collection cycles completed, requirements for the just in time compiler to compile a particular method at a high optimization level, or a combination of any of the factors or other suitable criteria.

In some example embodiments, process 400 transitions the class from observing to locking as soon as the lock count exceeds the threshold value instead of waiting until the end of the observation period. When this method is used, and when the threshold is zero, the lock count field in the class structure may be omitted.

Process 400 and process 300 of FIG. 3 can also be combined with the object-growing technique described previously to correct cases where objects not observed to lock during an observation period, later change behavior. The combined process improves over previous solutions by detecting locking objects and therefore reducing the probability of using a resource consuming growing operation.

Figure 5:
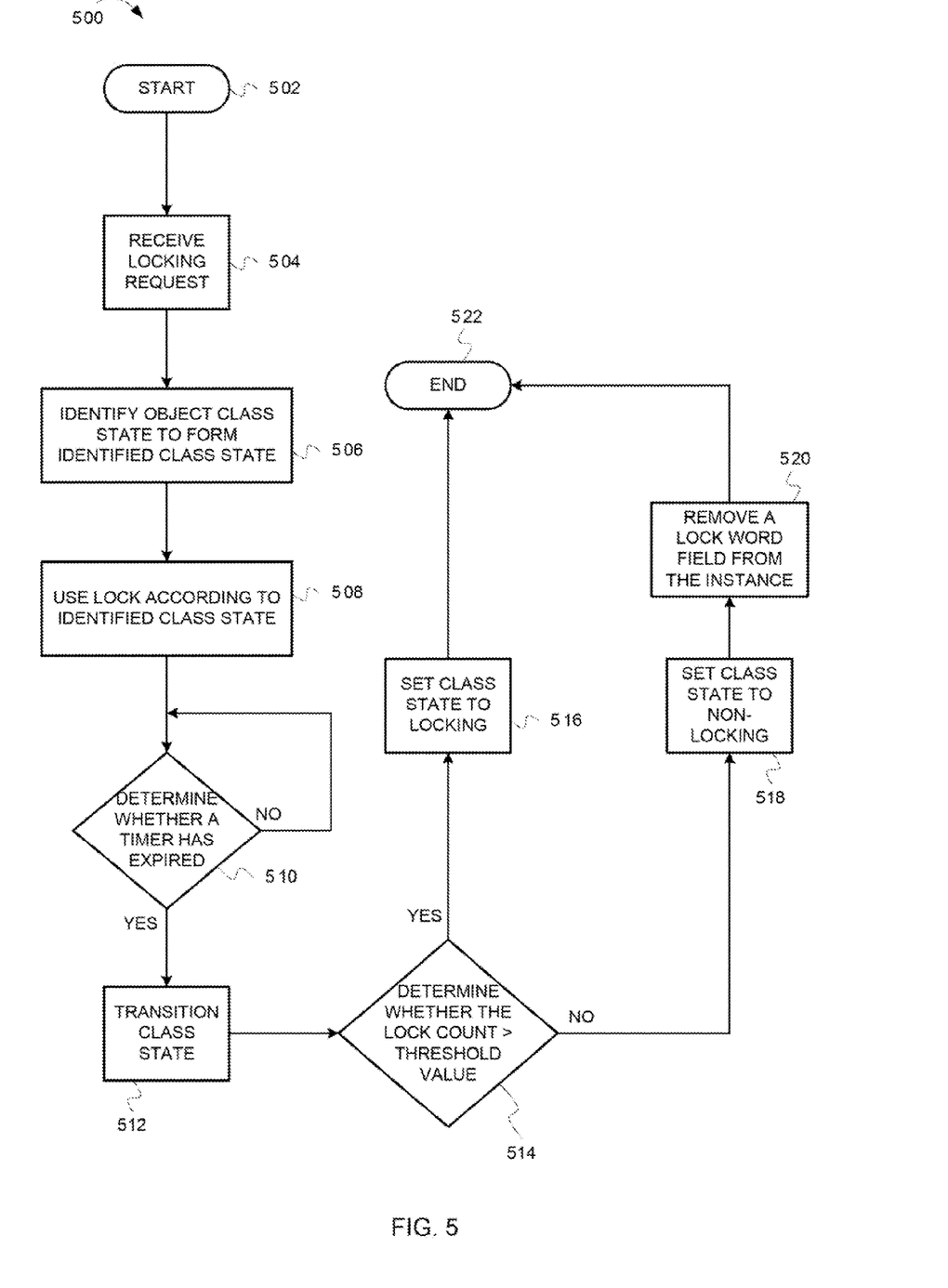
FIG. 5 depicts a flowchart of an overview of an object locking process, according to some example embodiments.

FIG. 5 depicts a flowchart of an overview of an object locking process, according to some example embodiments. Process 500 is a high level example of a combination of process 300 of FIG. 3 and process 400 of FIG. 4. A timer is used in the following example but as previously stated in an alternative example the timer may be ignored by simply not waiting for the expiration of the period. In another example the lock count can be set to a predetermined value of zero to force action as needed.

Process 500 starts (502) and receives a locking request for an object (504). Process 500 identifies the object class state to form an identified class state (506) Process 500 uses the lock according to the identified class state (508). Process 500 determines whether a timer has expired (510). When a determination is made that the timer has expired, a "yes" result is obtained. When a determination is made that the timer has not expired, a "no" result is obtained. When a "no" result is obtained in 510, process 500 loops back to perform 510.

When a "yes" is obtained in 510, process 500 transitions the class state (512). Process 500 determines whether a lock count is greater than a threshold value (514). The lock count for the instances is incremented for each lock request associated with an instance of the class. A predetermined threshold value may be set when the class is loaded and adjusted thereafter. The threshold value may be based on a specific class or system metric or a combination as required.

When a determination is made that the lock count is greater than a threshold value, a "yes" value is obtained. When a determination is made that the lock count is not greater than a threshold value, a "no" value is obtained. When a "yes" value is obtained in 514, process 500 sets the class state information to locking (516) with process 500 terminating thereafter 522). When a "no" value is obtained in 514, process 500 sets the class state information to non-locking (518). Process 500 removes a lock word field from the instance (520) with process 500 terminating thereafter (522). The removal of the lock word field may be performed immediately or a later time according to the needs and capabilities of the memory management portion and the data processing system.

Process 500 may optionally not use 510 and transition the class state. For example, when there is no need to have a time period for observing locking behavior the timer setting and checking can be bypassed. In such cases process 500 will avoid use of the timer and directly transition the class state using the lock count setting.

Figure 6:
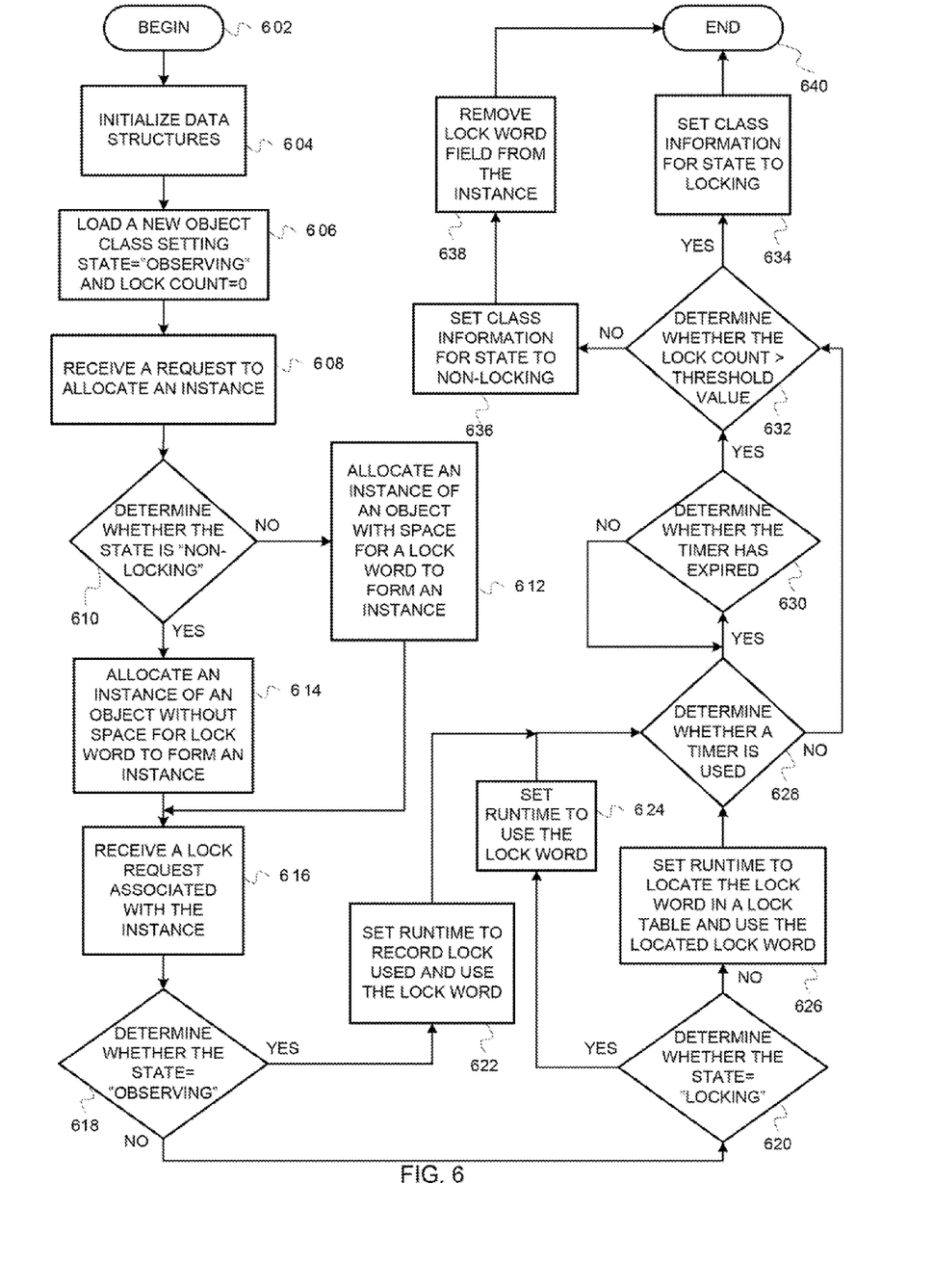
FIG. 6 depicts a flowchart of a detail view the object locking process of FIG. 5, according to some example embodiments.

FIG. 6 depicts a flowchart of a detail view the object locking process of FIG. 5, according to some example embodiments. Process 600 is a further detailed example of using process 500 of FIG. 5.

Process 600 starts (602) and initializes data structures (604). The initialized data structures are represented by the previously described data structures 200 of FIG. 2 including state and lock count information for the class. Process 600 loads a new object class, setting a class state to observing and a lock count to zero (606). Process 600 further receives a request to allocate an instance (608).

Process 600 determines whether the class state is non-locking (610). When a determination is made that the class state is non-locking, a "yes" result is obtained. When a determination is made that the class state is not non-locking, a "no" result is obtained. When a "no" result is obtained, process 600 allocates an instance of an object with space for a lock word to form an instance (612). When a "yes" result is obtained, process 600 allocates an instance of an object without space for a lock word to form an instance.

Process 600 receives a lock request associated with the instance (616). Process 600 determines whether the state is observing (618). When a determination is made that the state is observing, a "yes" result is obtained. When a determination is made that the state is not observing, a "no" result is obtained. When a "yes" result is obtained a runtime records the lock used and uses the lock word (622). Recording the lock used increments the lock count and the lock word used is the lock word in the object header. Process 600 skips ahead to 628.

When a "no" result is obtained process 600 determines whether the state is locking (620). When a determination is made that the state is locking, a "yes" result is obtained. When a determination is made that the state is not locking, a "no" result is obtained. When a "yes" result is obtained a runtime uses the lock word (624). When a "no" result is obtained a runtime locates a lock word in a lock table and uses the located lock word (626).

Process 600 determines whether a timer is used (628). A timer may be used to trigger an action based on the occurrence of an event such as a passage of a predetermined time period. Operations at 628 provide a capability to avoid use of a timer in cases where an observation period of locking activity is not necessary. When a determination is made that a timer is used a "yes" result is obtained. When a determination is made that a timer is not used a "no" result is obtained. When a "no" result is obtained in 628, process 600 performs operations at 632. When a "yes" is obtained in 628, process 600 determines whether the timer has expired (630). When a determination is made that the timer has expired a "yes" result is obtained. When a determination is made that the timer has not expired a "no" result is obtained.

When a "no" result is obtained in 630, process 600 loops back to perform operations at 630. When a "yes" result is obtained in 630, process 600 determines whether the lock count is greater than the threshold value (632). The lock count value is incremented for each lock request associated with an instance of the class. When a determination is made that the lock count is greater than the threshold value a "yes" result is obtained. When a determination is made that the lock count is not greater than the threshold value a "no" result is obtained.

When a "yes" value is obtained in 632, process 600 sets the class state information to locking (634) with process 600 terminating thereafter (640). When a "no" value is obtained in 632, process 600 sets the class state information to non-locking (636). Process 600 removes a lock word field from the instance (638) with process 600 terminating thereafter (640). The removal of the lock word field may be performed immediately or a later time according to the needs and capabilities of the memory management portion and the data processing system.

Thus embodiments of a process for software object lock management using observations have been presented. In one embodiment a computer-implemented process loads a class containing class information for a state and a lock count, allocates an instance of an object using the class information for the state to form an instance, receives a lock request associated with the instance, and selects a runtime behavior associated with the instance according to the class information. The computer-implemented process determines whether the lock count is greater than a threshold value, and responsive to a determination that the lock count is not greater than a threshold value, sets the class information for the state to non-locking and removes a lock field from the instance. A timer may be used to establish a period after which lock state transition occurs in addition to use of the lock count threshold analysis.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the example embodiments has been presented for purposes of illustration and description, but is not intended to be exhaustive or limited to the embodiments in the form disclosed.

Some example embodiments can take the form of an entirely hardware embodiment, an entirely software embodiment or an embodiment containing both hardware and software elements. Some example embodiments are implemented in software, which includes but is not limited to firmware, resident software, microcode, and other software media that may be recognized by one skilled in the art.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It is important to note that while the example embodiments have been described in the context of a fully functioning data processing system, those of ordinary skill in the art will appreciate that the processes are capable of being distributed in the form of a computer readable medium of instructions and a variety of forms and that example embodiments apply equally regardless of the particular type of signal bearing media actually used to carry out the distribution. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method comprising:
loading a software class containing class information for a lock state;
allocating an instance of a software object derived from the software class, wherein the allocating includes allocating of a lock word as part of the instance of the software object, the lock word defining whether the software object is locked by a thread of multiple threads;
observing activity relative to the instance of the software object; and
responsive to observing the activity relative to the instance of the software object that indicates that the lock state of the instance of the software object is non-locking, removing the lock word from the instance of the software object, wherein removing the lock word from the instance of the software object is delayed relative to the observing of the activity relative to the instance of the software object that indicates that the lock state of the instance of the software object is non-locking.

2. The method of claim 1, wherein observing the activity relative to the instance of the software object comprises observing activity that includes locking of the instance of the software object, independent of a period of time.

3. The method of claim 1, wherein observing the activity relative to the instance of the software object comprises observing the activity relative to the instance of the software object for a time period, wherein the activity relative to the instance of the software object that indicates that the lock state of the instance of the software object is non-locking comprises activity that includes a lock count that is below a threshold.

4. The method of claim 3, wherein the threshold is derived from at least one of a number of lock requests for instances of the software class, time, a number of software objects allocated for the software class, and a number of garbage collection cycles processed.

5. A computer-implemented method for software object lock management using observations, the computer-implemented method comprising:
loading a class containing class information for a state and a lock count;
allocating an instance of a software object using the class information for the state to form an instance;
receiving a lock request associated with the instance;
selecting a runtime behavior associated with the instance according to the class information;
determining whether the lock count is greater than a threshold value;
responsive to a determination that the lock count is not greater than a threshold value, setting the class information for the state to non-locking; and
responsive to setting the class information for the state to non-locking, removing a lock field from the instance, wherein removing the lock word from the instance is delayed relative to setting the class information for the state to non-locking that indicates that the state of the instance of the software object is non-locking.

6. The computer-implemented method of claim 5, wherein allocating an instance of the software object using the class information to form an instance further comprises:
determining whether the state is non-locking;
responsive to a determination that the state is non-locking, allocating an instance of the software object without space for a lock word; and
responsive to a determination that the state is not non-locking, allocating an instance of the software object with space for a lock word.

7. The computer-implemented method of claim 6, wherein selecting a runtime behavior associated with the instance according to the class information further comprises:
determining whether the state is observing; and
responsive to a determination that the state is observing, setting a runtime to record lock used and use the lock word.

8. The computer-implemented method of claim 6, wherein selecting a runtime behavior associated with the instance according to the class information further comprises:
determining whether the state is locking; and
responsive to a determination that the state is locking, setting a runtime to use the lock word.

9. The computer-implemented method of claim 6, wherein selecting a runtime behavior associated with the instance according to the class information further comprises:
determining whether the state is non-locking; and
responsive to a determination that the state is non-locking, setting a runtime to locate the lock word in a lock table and use the lock word.

10. The computer-implemented method of claim 5, wherein determining whether the lock count is greater than a threshold value further comprises:
determining whether a timer is used;
responsive to a determination that the timer is used, determining whether the timer has expired; and
responsive to a determination that the timer has not expired, continuing to determine whether the timer has expired.

11. The computer-implemented method of claim 5, wherein responsive to a determination that the lock count is greater than a threshold value further comprises:
determining whether the lock count is greater than a threshold value; and
responsive to a determination that the lock count is greater than a threshold value, setting the class information for the state to locking.

12. A computer program product for software object lock management using observations, the computer program product comprising:
a non-transitory computer readable storage medium having computer usable program code embodied therewith, the computer usable program code comprising a computer usable program code configured to:
load a software class containing class information for a lock state;
allocate an instance of a software object derived from the software class, wherein allocation includes allocation of a lock word as part of the instance of the software object, the lock word defining whether the software object is locked by a thread of multiple threads;
observe activity relative to the instance of the software object; and
responsive to observation of the activity relative to the instance of the software object that indicates that the lock state of the instance of the software object is non-locking, remove the lock word from the instance of the software object, wherein removal of the lock word from the instance of the software object is delayed relative to the observation of the activity relative to the instance of the software object that indicates that the lock state of the instance of the software object is non-locking.

13. The computer program product of claim 12, wherein observation of the activity relative to the instance of the software object comprises observation of activity that includes locking of the instance of the software object, independent of a period of time.

14. The computer program product of claim 12, wherein observation of the activity relative to the instance of the software object comprises observation of the activity relative to the instance of the software object for a time period, wherein the activity relative to the instance of the software object that indicates that the lock state of the instance of the software object is non-locking comprises activity that includes a lock count that is below a threshold.

15. The computer program product of claim 14, wherein the threshold is derived from a number of lock requests for instances of the software class, time, a number of software objects allocated for the software class, and a number of garbage collection cycles processed.

16. An apparatus for software object lock management using observations, the apparatus comprising:
   a communications fabric;
   a memory connected to the communications fabric, wherein the memory contains computer executable program code; and
   a processor unit connected to the communications fabric, wherein the processor unit is configured to execute the computer executable program code to:
      load a class containing class information for a state and a lock count;
      allocate an instance of a software object using the class information for the state to form an instance;
      receive a lock request associated with the instance;
      select a runtime behavior associated with the instance according to the class information;
      determine whether the lock count is greater than a threshold value;
      responsive to a determination that the lock count is not greater than a threshold value, set the class information for the state to non-locking; and
      responsive to setting the class information for the state to non-locking, remove a lock field from the instance, wherein the remove of the lock word from the instance is delayed relative to setting the class information for the state to non-locking that indicates that the state of the instance of the software object is non-locking.

17. The apparatus of claim 16, wherein the processor unit is configured to execute the computer executable program code to:
   determine whether the state is non-locking;
   responsive to a determination that the state is non-locking, allocate an instance of the software object without space for a lock word; and
   responsive to a determination that the state is not non-locking, allocate an instance of the software object with space for a lock word.

* * * * *